Figure 8:
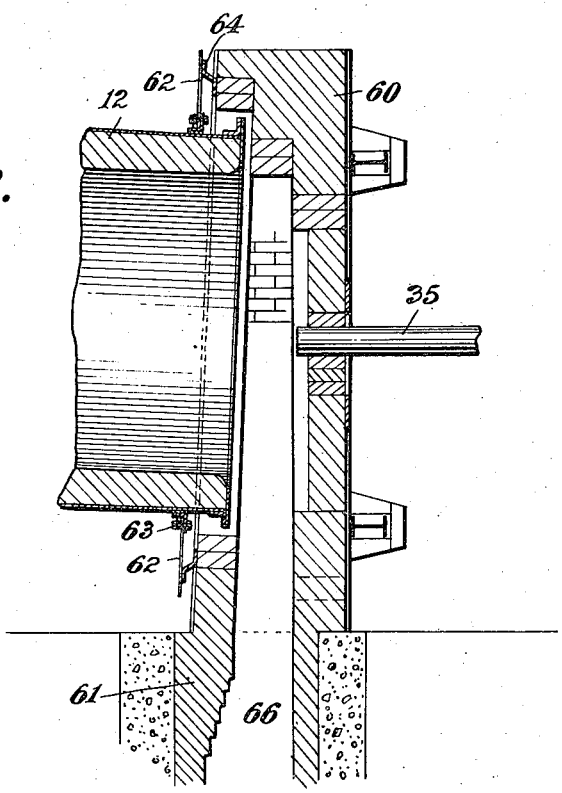

Nov. 9, 1926.                                                                  1,606,125
                           J. W. HORNSEY
               TREATING CEMENT MIX AND OTHER MATERIALS
                 Original Filed July 9, 1919     6 Sheets-Sheet 1
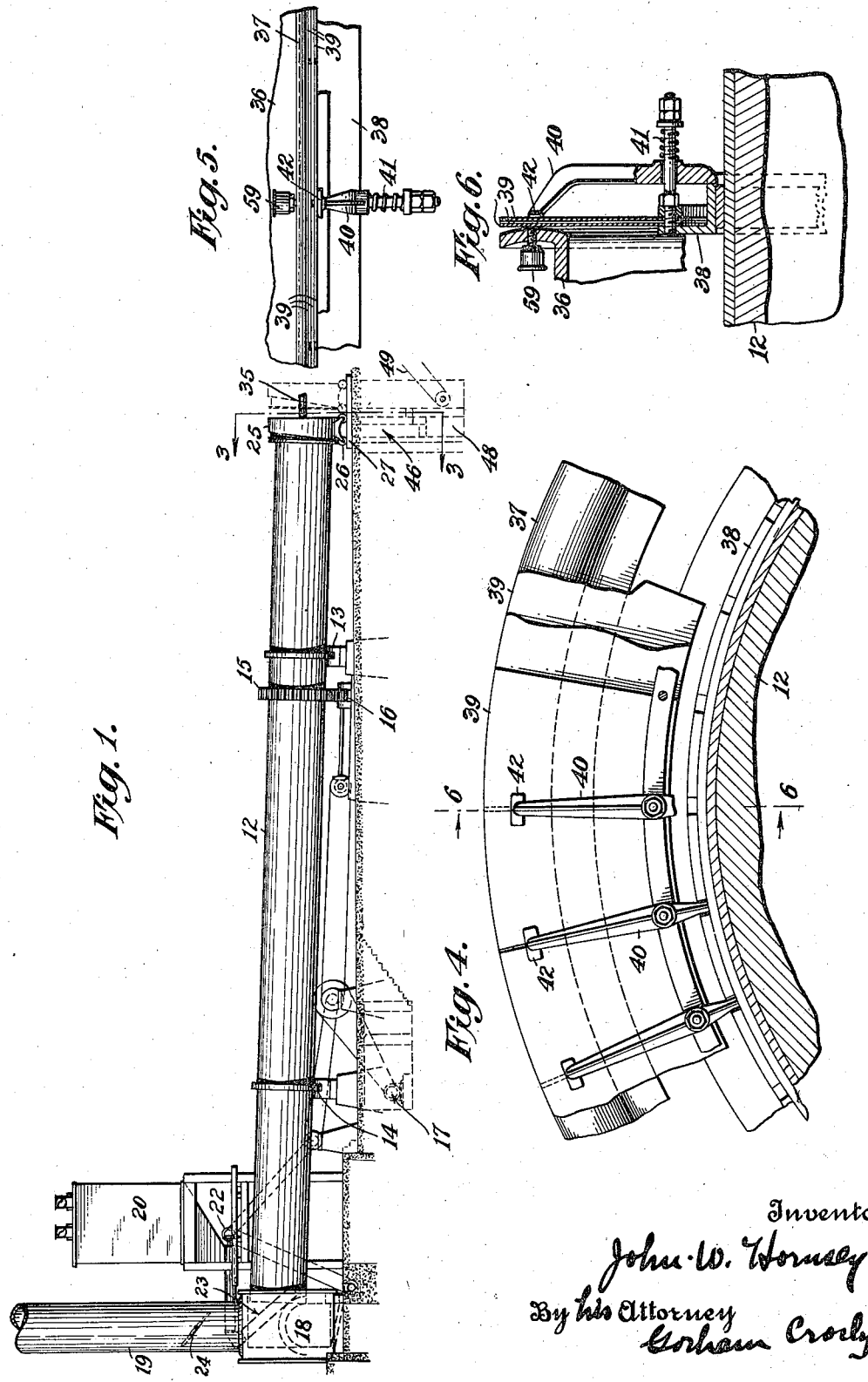

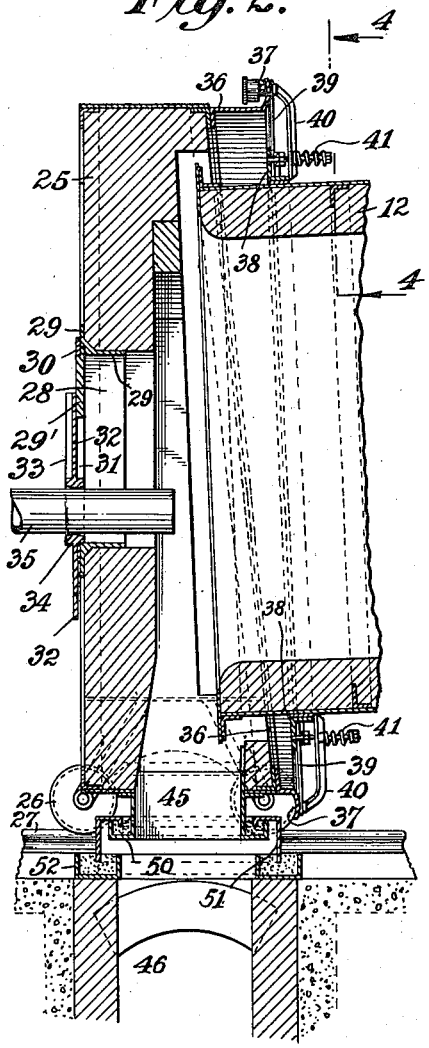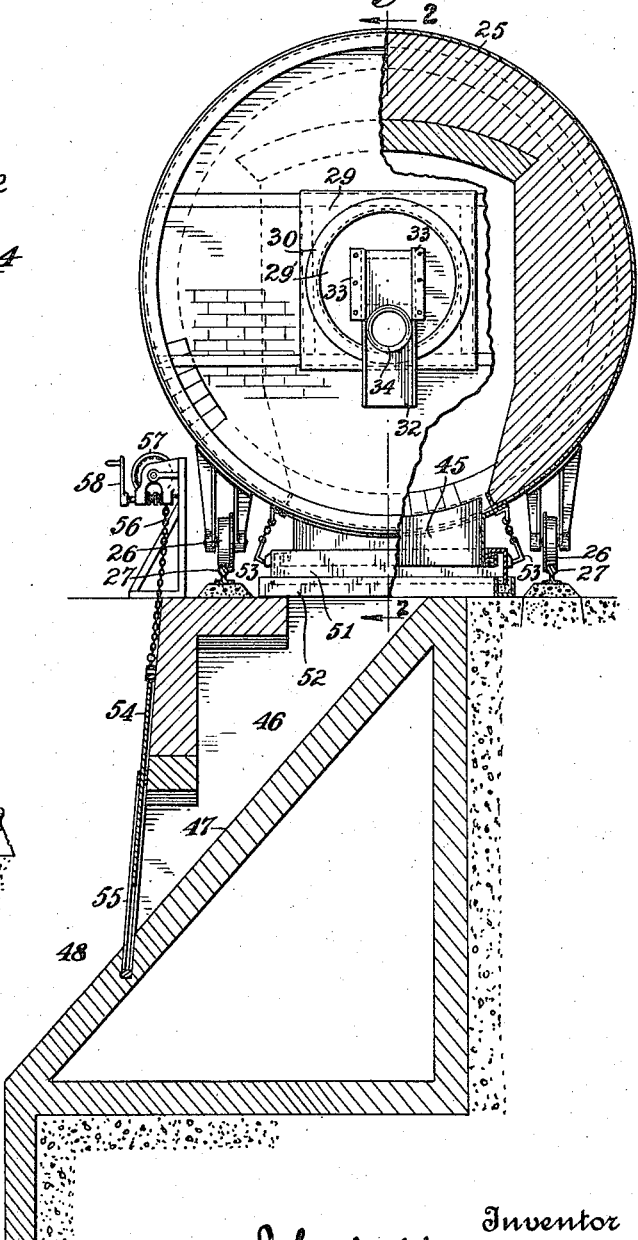

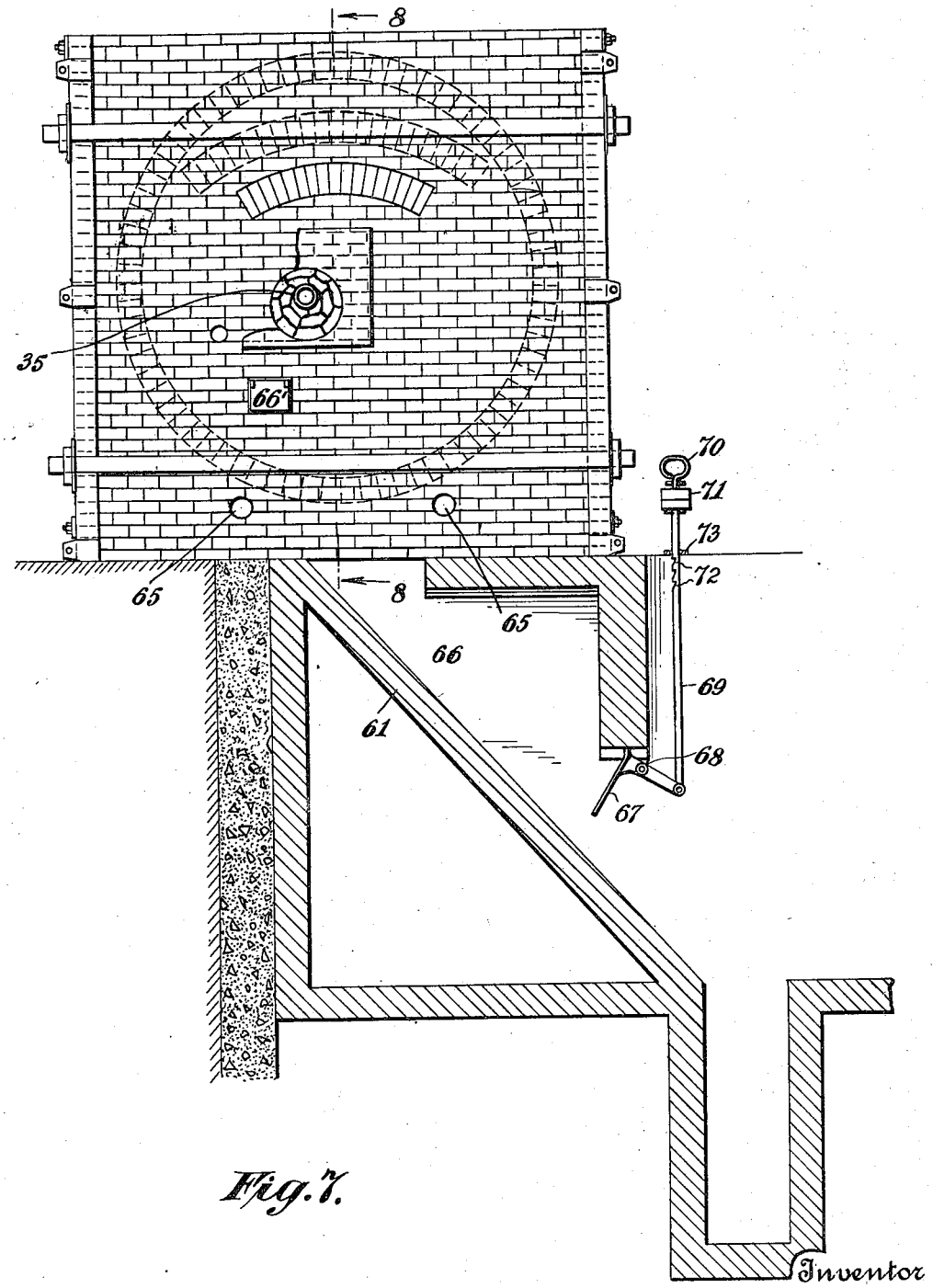

Nov. 9, 1926.

J. W. HORNSEY 1,606,125

TREATING CEMENT MIX AND OTHER MATERIALS

Original Filed July 9, 1919 - 6 Sheets-Sheet 4

Inventor
John W. Hornsey
By his Attorney
Gorham Crosby

Nov. 9, 1926.  1,606,125
J. W. HORNSEY
TREATING CEMENT MIX AND OTHER MATERIALS
Original Filed July 9, 1919    6 Sheets-Sheet 5

Inventor
John W. Hornsey
By his Attorney
Gorham Crosby

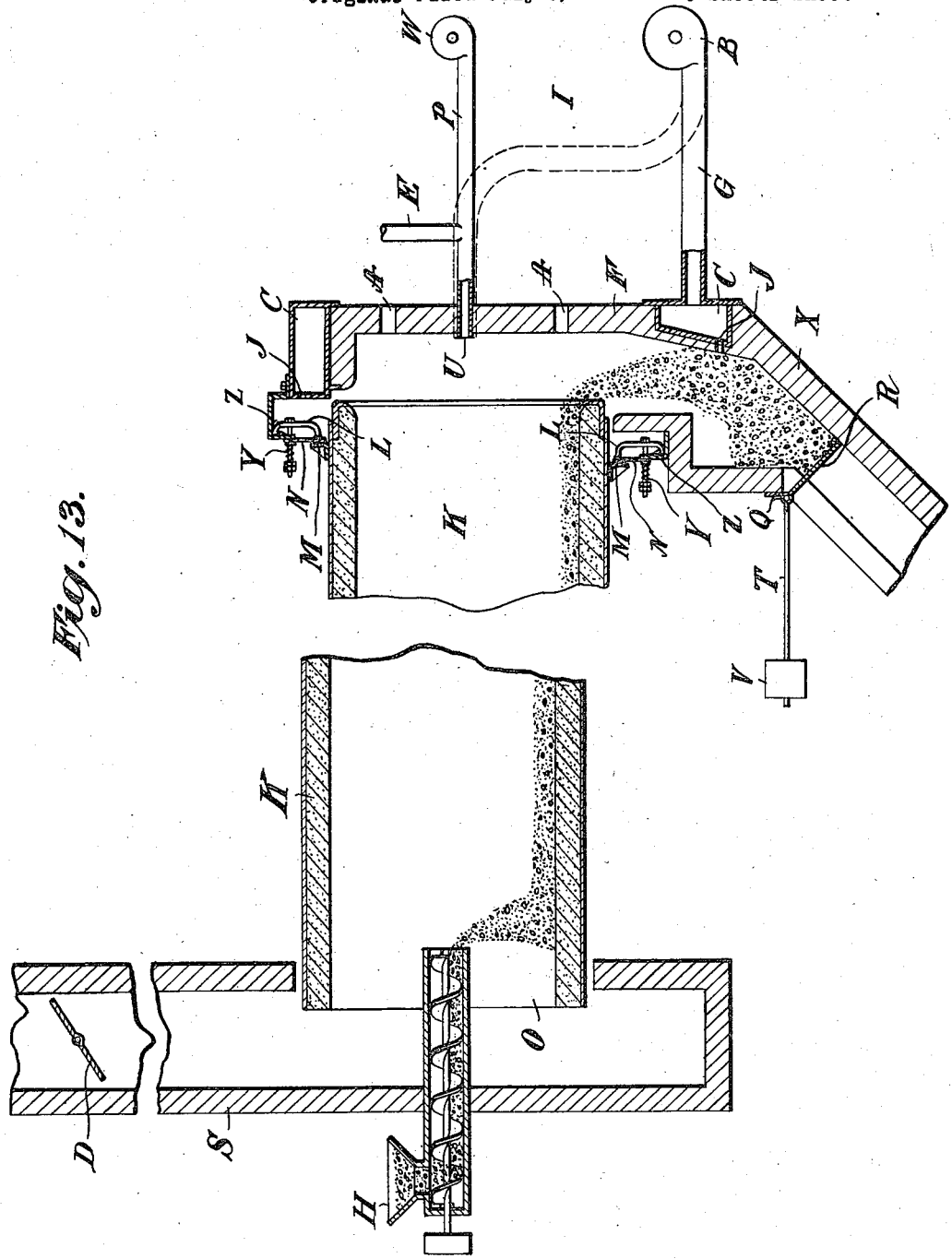

Patented Nov. 9, 1926.

1,606,125

UNITED STATES PATENT OFFICE.

JOHN W. HORNSEY, OF NEW YORK, N. Y., ASSIGNOR, BY MESNE ASSIGNMENTS, TO GRANULAR IRON COMPANY, A CORPORATION OF MICHIGAN.

TREATING CEMENT MIX AND OTHER MATERIALS.

Application filed July 9, 1919, Serial No. 309,658. Renewed January 26, 1925.

My invention relates to improvements in treating cement mix and the like and more particularly the sintering of Portland cement mix in rotary kilns.

In the manufacture of Portland cement and other operations it has been customary to provide a long cylindrical rotary kiln and inject fuel into the delivery end of the kiln to raise the temperature therein to the desired point and feed the material to be treated into the opposite end of the cylinder which may be slightly tilted or inclined so that the material is gradually fed downward toward the delivery end of the kiln by the rotation thereof. In such arrangements it has also been common to provide a furnace structure in front of the delivery end of the kiln for the purpose of closing the delivery end of the kiln to some extent, said structure being provided with a suitable opening or means by which the fuel may be introduced therethrough to be burned in the delivery end of the kiln, the hot products of combustion being carried along the kiln to the feed end thereof, where they are allowed to escape through a suitable stack. For such purposes it is common to use rotary kilns having a length of about 10 times their diameter or more, varying in size from 6 feet in diameter and 60 feet in length to 10 feet in diameter and 150 feet in length or more. These kilns are generally supported on two sets of roller bearings only, longitudinally of the kiln. Due to the high temperature to which the kiln is raised, and the excessive weight thereof, and the fact that the ends of the kiln overhang these bearings for several feet the furnace end of the kiln is soon caused to bend down or swing radially to a very considerable extent during the rotation thereof, that is the end of the kiln is given an eccentric motion so that the structures which have been used for partially closing the delivery end of the kiln have been cut away to provide ample clearance space for this eccentric or radial movement of the delivery end of the kiln thereby resulting in a relatively large air space or opening to the external atmosphere extending around between the delivery end of the kiln and this structure, which air space varies in size at various points with the rotation of the kiln. Furthermore, the high temperature to which the kiln is heated causes the same to expand gradually so that the delivery end of the kiln moves an inch or more in a direction longitudinally of the kiln and the non-rotating structure at the delivery end of the kiln must be cut away to accommodate this movement at the delivery end of the kiln.

I have found that in the operation of such kilns there is a great loss in energy and thermal efficiency by reason of the air space or opening between the delivery end of the kiln and the non-rotating structure opposite thereto and at other passages at the delivery end of the kiln to the outside atmosphere and that the air entering the kiln through these passages and the combustion gases passing out through these passages not only cause loss of fuel and heat but a very uneven operation of the kiln which materially decreases its efficiency, especially with variations in atmospheric conditions external to the stack, which cause a very uneven and variable draft through the kiln, and cause too much air to be drawn in which unduly cools the clinker at places, and requiring the consumption of an excessive amount of fuel. The main object of the present invention is to so improve the method that this excessive use of fuel is eliminated and the sintering accomplished under relatively uniform conditions whereby the clinker in the kiln is not subjected to relatively cold and uneven drafts which frequently cause the clinker layer, which adheres to the inside of the kiln, to crack and break away in places, greatly shortening the life of the apparatus as well as decreasing its capacity.

According to my invention I regulate the draft through the kiln and adjust the supply of cement mix and the amount of air or oxygen and fuel introduced whereby conditions are kept more uniform and a large saving in fuel is obtained and the operation rendered much more efficient.

Further and more specific objects, features, and advantages will more clearly appear from the detail description given below taken in connection with the accompanying drawings which form a part of this specification.

Figure 9:
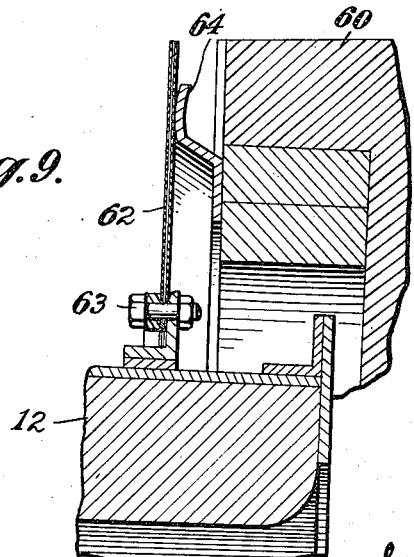
Figure 10:
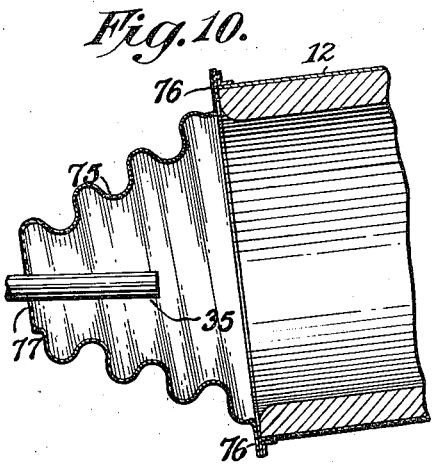
Figure 12:
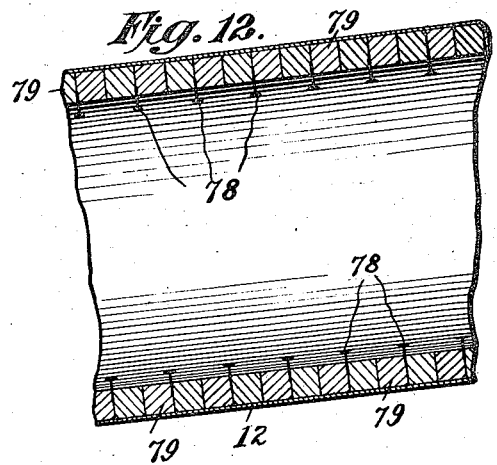
Figure 11:
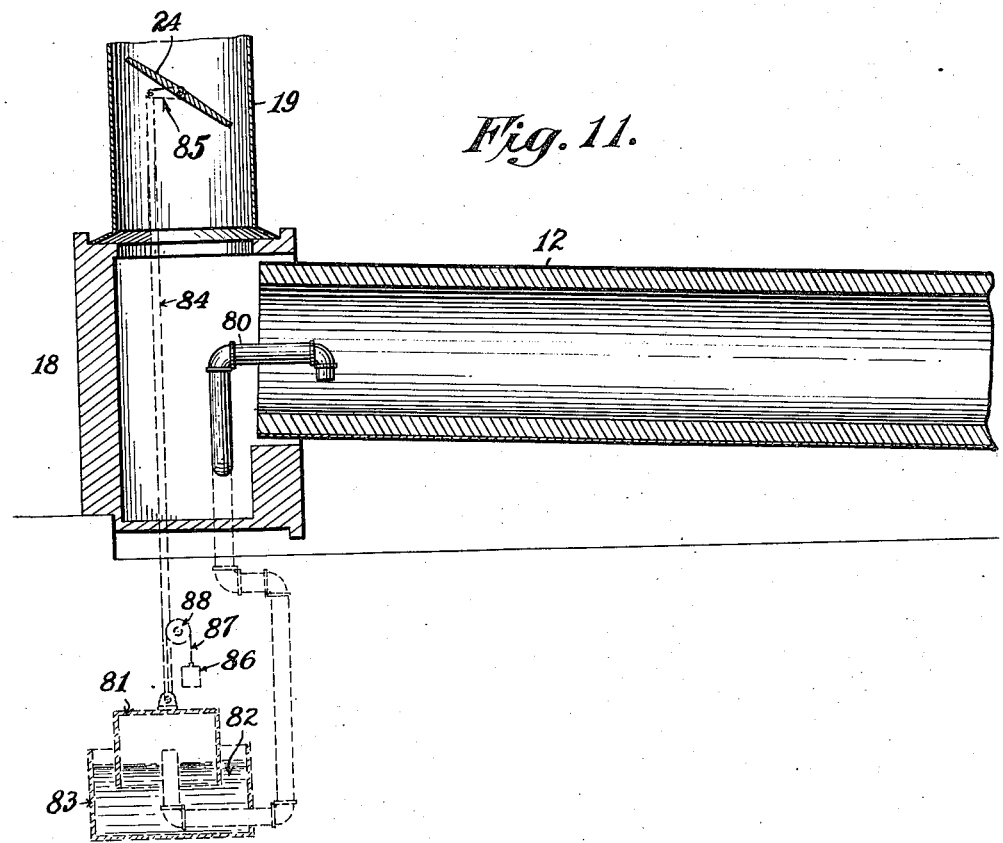

Referring to the drawings Fig. 1 is a vertical view, partly diagrammatic, showing a preferred form of apparatus adapted to carry out my process. Fig. 2 is a vertical section through the delivery end of the kiln and furnace structure thereat taken on the line 2—2 of Fig. 3. Fig. 3 is a face view of the outer end of the furnace structure taken on the line 3—3 of Fig. 1, the same being partially broken away to more clearly illustrate certain parts thereof. Fig. 4 is a detail section taken on the line 4—4 of Fig. 2. Fig. 5 is a plan view of part of the devices shown in Fig. 4. Fig. 6 is a section taken on the line 6—6 of Fig. 4. Fig. 7 is a vertical view illustrating a modified form, the lower part being in vertical section taken through the delivery chute. Fig. 8 is a vertical section taken on the line 8—8 of Fig. 7. Fig. 9 is an enlarged detail section of parts shown in Fig. 8. Fig. 10 is a vertical section illustrating another modification, Fig. 11 is a vertical section of the stack end of the apparatus illustrating automatic adjustment of the stack damper, Fig. 12 is a detail vertical section through the kiln illustrating special means tending to prevent the clinker layer from breaking away from the inside surface of the kiln, and Fig. 13 is a diagrammatic illustration in vertical section of an arrangement showing still further modifications.

Referring to Fig. 1, I there show an inclined rotary kiln 12 having a length about 10 times its diameter or more and provided with one set of roller bearings at 13 and another set of roller bearings at 14, thus forming only two sets of bearings for the kiln, longitudinally thereof. The bearings are provided with suitable end thrust rolls for preventing the kiln slipping longitudinally. The kiln is provided with a gear 15 adapted to be rotated by gear 16 driven through suitable gears and belts by a motor 17 to rotate the kiln at a suitable slow speed. The kiln 12 at its upper end enters the base 18 of the stationary stack 19 through which the spent gases of the combustion may escape. 20 represents a suitable storage bin for the cement mix or other material to be treated, and from the bottom of the chamber 20 the material is fed through a passage by any suitable conveyor driven through gearing 22 to cause the material to be fed into the base of the stack 18 and down a chute 23 into the feed end of the kiln 12. An adjustable damper 24 is provided in the stack 19 for the purpose of regulating the draft up the stack and from the stack end of the kiln. At the lower and delivery end of the kiln there is provided a furnace structure 25 adapted to be moved up to and away from the end of the kiln by being supported by wheels 26 operating on tracks 27. As shown in Fig. 2 the kiln 12 is made of a suitable steel cylindrical casing lined with any suitable fire brick and the furnace structure 25 is similarly constructed and provided with a central opening 28, into which is fitted a steel frame 29 having a central opening corresponding with the opening 28 and covered by a circular plate 29' rotatable in the front part of the opening 28 in a circular guide 30, and the plate 29' is provided with a slot 31 over which is adapted to slide vertically a plate 32 in guides 33 secured to the front of the plate 29'. The plate 32 is provided with a circular opening at 34 into which is inserted a pipe 35 by means of which mixed fuel and air is injected into the delivery end of the kiln and burned therein. By moving the plate 32 up and down the height of the pipe 35 may be adjusted to various positions and by swinging the plate 29' around the position of the pipe 35 may be adjusted laterally with respect to the delivery end of the kiln.

The fuel used may be oil, powdered coal or other fuel mixed with air or oxygen and injected into the kiln substantially centrally thereof through the pipe 35 and burned, whereby hot gases of combustion are produced to heat the kiln and its contents to a high temperature, the products of combustion coming directly into contact with the material being treated in the kiln.

Secured to the structure 25 is a circular rim 36 provided with a curved circumferential flange 37, and secured to the kiln 12 adjacent the delivery end thereof is a circumferential angle bar 38 to which is rigidly secured a series of thin steel plates 39. The plates 39 bear against the circumferential flange 37 and the plates 39 overlap one another so that the opening surrounding the delivery end of the kiln to the outside atmosphere is substantially closed. In order to maintain the plates 39 firmly against the flange 37 I provide lever members 40 having their inner ends bearing against the angle bars 38 and their outer ends bearing against the ends of the plates 39 and pressing the same against the flange 37 under the action of compression springs 41.

As shown more clearly in Figs. 4, 5 and 6 the plates 39 are arranged in three layers in staggered relation so as to form a substantially tight joint or seal entirely around the delivery end of the kiln and the levers 40 are provided with flat end portions 42 engaging the adjoining edges of adjacent outer plates 39. It will be understood that by providing this closing means cooperating with the furnace structure and the furnace end of the kiln, I am enabled to substantially close the clearance space or opening to the outside atmosphere therebetween around the kiln while permitting the end of the kiln to move radially several inches in any direction while the plates 39 slide over the flange 37 during the rotation of the kiln and likewise the furnace end of the kiln may move axially an inch or more due to expansion or contraction and to accommodate this movement the flexible plates 39 may bend and the levers 40 give under the action of springs 41 so that in spite of this large relative movement of the end of the kiln with respect to the relatively stationary structure 25, the opening which would otherwise exist between the furnace structure and the furnace end of the kiln and connected with the outside atmosphere, is maintained substantially closed or sealed. Grease cups 59 provide lubricant for the surfaces which slide over one another.

The bottom part of the structure 25 is cut away to provide an opening therethrough directly under the end of the kiln and secured to the bottom of the structure 25 and forming an extension of this opening is a cylindrical member 45. Below the cylindrical member 45 I provide a passageway 46 built up of suitable brick, concrete or the like and as the material treated is delivered from the furnace end of the kiln it drops through the opening in the bottom of the structure 25 through the member 45 and into the passageway 46 where it slides down the incline 47 and may drop into pit 48 from which it may be conveyed to any suitable cooling means such as a cooling cylinder, by means of any suitable conveyor indicated diagrammatically at 49 in Fig. 1. In order to prevent the uncontrolled entrance of air through the opening in the bottom of structure 25, the member 45 is provided with an external trough 50 which is filled with sand into which dips a downwardly extending inner flange of a member 51, the lower edge of which member 51 dips into sand in a trough 52 rigidly secured on top of the passageway 46. In this way all connection to the outside atmosphere between the lower end of the structure 25 and the passage 46 is substantially shut off while permitting slight movement or adjustment of the structure 25 along the rails 27.

When it is desired to remove the structure 25 at some distance from the end of the kiln in order to obtain access to the latter for inspection and repairs, the member 51 may be raised to a position where it is out of alignment with the trough 52 and held in its raised position by means of hooks 53 whereupon the whole structure 25 may be rolled back along the tracks 27. When again put into operation the structure 25 is rolled up to the delivery end of the kiln and the wheels 26 may be blocked to hold it thereto in operative position.

It is desirable to regulate the amount of air entering the kiln relative to the cement material and fuel. In order to prevent any undue amount of air entering the delivery end of the kiln through the passageway 46 I provide at the lower end of the passageway 46 a gate 54 operating in guides 55 and adapted to be raised and lowered by means of a chain 56 passing over a drum 57, adapted to be operated through worm gearing by handle 58. If too much air enters through the passageway 46 the gate 54 may be lowered to partially close the lower end of the passageway while allowing the cement clinker to still pass out underneath the gate, and if desired an increased amount of air may be injected through the pipe 35 with the fuel. Or if it is desired that more air enter through the passageway 46 the gate 54 may be opened to the desired extent and if desired a less amount of air injected through the pipe 35 with the fuel.

By thus substantially closing or sealing the delivery or furnace end of the kiln I prevent excessive drafts of cold air being drawn into the kiln at this end and I also prevent gases of combustion from being blown out around the delivery end of the kiln, and by properly adjusting the stack damper and regulating the amount of air or oxygen admitted with the fuel and proportioning these to the amount of cement mix introduced, I may reduce the fuel used to very closely the theoretical amount required to properly heat the kiln and the material passing therethrough. Heretofore it has generally occurred that a considerable quantity of the combustion gases would be forced out around the top of the delivery end of the kiln even though cold air be sucked in around the bottom of the kiln. The large quantities of cold air drawn into the delivery end of the kiln required much excess fuel to heat cold air which air is not needed for complete combustion of the minimum fuel required, and the cold air also caused an uneven temperature in the kiln which would cause the preferably even clinker layer adhering to the inner walls of the kiln (and protecting the same as well as forming heat insulation) to break away, thereby causing relatively large radiation variations and radiation losses. But by substantially closing off these air spaces around the end of the kiln as by the flexible means described, and by providing the adjustable damper 24 at the stack end and the means for regulating the entrance of air through the clinker outlet, I am enabled to control draft conditions throughout the kiln so that substantially only the necessary quantity of oxygen or air for combustion is admitted with a reduced amount of fuel and the conditions are equalized and made substantially independent of wind and other atmospheric conditions external to the apparatus. By maintaining a substantially constant draft through the kiln and a substantially constant clinker layer adhering to the inner walls of the kiln I reduce the radiation variations and losses, and by maintaining a substantially constant rate of cement material passing through the kiln and regulating the oxygen or air supply such that substantially constant temperature is maintained in the kiln with a substantially constant rate of fuel consumption, conditions are further equalized and coordinated to produce much greater efficiency. These conditions, I preferably adjust so that the Portland cement mix (consisting of natural raw materials such as limestone and clay or limestone and cement rock, as distinguished from blast furnace slag) is introduced into the kiln at a rate greater than one pound for every 1800 B. t. u. produced by the fuel consumed or such that the clinker is produced at a rate greater than one pound for every 2800 B. t. u. produced by the fuel consumed and still maintain substantially complete burning of the cement material and under favorable conditions I can make it as low as 1400 B. t. u. for every pound of raw mix introduced or 2200 B. t. u. for every pound of cement clinker produced.

While various fuels may be used I have obtained the above results with an average West Virginia gas coal having the following composition: carbon 73.60, hydrogen 5.30, nitrogen 1.70, sulphur 0.75, oxygen 10.00, moisture 0.60, ash 8.05.

Referring to Figures 7, 8 and 9 I there show a modified arrangement in which the furnace structure 60 is arranged stationary and substantially integral with the pit structure 61. In this arrangement the clearance space between the lower end of the kiln and the furnace structure 60 is closed by means of circumferentially arranged flexible resilient plates 62 having their inner ends secured to the rotary kiln by bolts 63, the plates 62 being adapted to resiliently bear against and slide over a circumferential member 64 secured to the furnace structure 60. The furnace structure 60 is provided with air openings 65 through which a small amount of air may be admitted and which is needed for combustion. If more air is needed a door 66' may be opened up to uncover another opening to permit more air to be admitted through the furnace structure to combine with the fuel for combustion.

The cement clinker is delivered from the kiln 12 into the furnace structure and drops down into the chute 66 and flows out thereof under a gate 67. The gate 67 is pivoted at 68 and has connected thereto a link 69 provided at its upper end with a handle 70 and weights 71 tending to maintain the gate 67 in the position shown in Figure 7. If it is desired that more air be admitted the handle 70 may be pulled upwardly to further open the gate 67 so as to increase the area of the opening thereby and thus permit more air to be drawn up through the chute 66 into the delivery end of the kiln. The link 69 is provided with notches 72 which may engage the edge of a plate 73 to hold the gate in an adjusted position. It will be understood that any suitable means may be used to regulate the amount of fuel introduced through the fuel pipe 35 together with more or less air which may be introduced therewith through the fuel pipe 35 and with the other means described the total amount of air entering the kiln may be accurately controlled so that the amount of fuel and air introduced may correspond very closely to the theoretical amount required to heat the kiln and convert the material passing therethrough.

Referring to Figure 10 I there show a modified method of substantially sealing off the delivery end of the kiln. In this arrangement instead of providing a stationary or non-rotating structure for largely closing the delivery end of the kiln there is provided a metallic end member 75 having a circumferential flange 76 at its large end closely fitting and rigidly secured to the periphery of the delivery end of the kiln. At its outer and small end the conical structure 75 is provided with a small opening 77 through which the fuel pipe 35 extends. The opening 77 is large enough to permit some air to be drawn in therethrough and into the kiln, but is sufficiently small so that no material excess of air is drawn in. The member 75 is grooved or corrugated, the corrugations or grooves being screw-shaped so that as the cement clinker flows from the kiln 12 into the member 75 the cement clinker is automatically fed upwardly with the rotation thereof and is finally delivered out through the opening 77 into any suitable pit or conveyor.

Referring to Figure 12 I there show an arrangement in which nails 78 are driven in between the fire bricks 79 with which the rotary kiln 12 is lined. The nails 78 are only driven partially in so that the heads thereof extend out some little distance. In the operation of the kiln there is formed a layer of cement clinker adhering to the inside surfaces of the kiln and it is desirable that this layer be maintained therein as it not only prevents radiation of heat through the kiln, but serves as heat insulation for the kiln and greatly lengthens its life. The use of the addition of the nails 78 is to prevent this cement clinker layer from so easily breaking off from the inner surface of the kiln and forming irregular depressions and thereby irregular heat insulation and variations in heat radiations from the kiln which are undesirable.

Referring to Figure 11 I there show the damper 24 in the stack 19. Extending into the stack end of the kiln 12 is a pipe 80 which extends down under and up into a bell-shaped member 81, having its lower edges dipping down below the surface of water 82 in a container 83. 84 represents a link having its lower end connected to the bell-shaped member 81 and its upper end pivotally connected to a lever arm 85 for operating the damper 24. There is also provided a weight 86 suspended by cord 87 passing over pulley 88 and having its other end connected to the bell-shaped member 81. Should the suction in the upper end of the kiln 12 be greater than that desired it will tend to suck air or gas through the pipe 80 from under the bell 81 and thus cause it to pull down on the link 84 and close the damper 24 so as to bring the suction or pressure in the upper end of the kiln back to the desired value. If the suction in the upper end of the kiln is not as much as desired, air or gas will be permitted to flow through the pipe 80 and up under the bell-shaped member 81 causing it to raise the link 84 and open the damper 24 until the suction is increased to the desired value and the pressure regulated to the point desired. In this way the barometric pressure in the stack end of the kiln may be automatically varied in accordance with variations which may tend to change the same occurring at the furnace end of the kiln, and a substantially constant draft may be maintained in the kiln. However, the damper 24 may be hand operated for this purpose, if desired.

Referring to Figure 13, I there show a horizontal rotary hollow kiln cylinder K, and a stationary furnace F located at one end of the cylinder, both lined with firebrick or other heat resisting material as shown. At the left or stack end of the kiln cylinder K is an outlet O for the products of combustion leading to the stack S or other source of draft provided with adjustable damper D which may or may not be automatically operated as above described. As previously explained, heretofore there has been a substantial clearance space between the furnace F and the rotary cylinder K which has been utilized or relied upon as an inlet for a large portion of the air used for combustion in the kiln. The material to be treated is fed into the kiln K at its stack end by feeding devices such as the hopper H, provided with a suitable screw conveyor and this supply is variable at the will of the operator. Cylinder K is inclined down slightly in the direction away from the feed H, as indicated in the drawings, whereby when the cylinder K rotates, the material gradually travels from one end thereof to the other so that by the time its treatment is completed it reaches the furnace end of the cylinder where it drops into a box or chute X constituting a lower part of the furnace structure F, in which box the finished material accumulates in a pile against a door R, which from time to time may be opened by the operator to drop out the material or the door may be opened automatically when a certain weight of material accumulates thereagainst to permit the material to pass thereunder. Combustion is initiated at the burner U, supplied with air and fuel through pipe P extending through the wall of furnace F to the burner U. Combustion is, however, seldom completed in the furnace F as the flame extends some distance in the cylinder K. The fuel may consist of pulverized coal or oil or gas, and any suitable feeding apparatus may be used for this purpose. In the apparatus shown in Figure 13, however, I prefer to use pulverized coal supplied through pipe E in variable quantities at the will of the operator. From the pipe E the fuel drops into air pipe P which is connected to any suitable blower or air supply W, the purpose of which is to carry the pulverized soal into the burner, the air for this purpose containing a small part of the air or oxygen which is to be introduced into the furnace for combustion. In some cases the furnace F may be provided with one or more openings A in its end wall to permit the operator to insert a bar through the furnace and into the cylinder K to break off rings of clinkered material which sometimes form on the furnace end of the cylinder. Such openings have also been used for the admission of air and to permit the operator to observe the condition of the material under treatment, the state of combustion, etc. In order that an excess of air may be prevented from entering the kiln and the amount of air introduced accurately controlled, I provide sealing means for sealing off the clearance space between the lower end of the cylinder K and the furnace structure F which sealing means comprises flexible plates N rigidly secured to a circumferential flange Z, carried by the furnace structure. The plates N are adapted to bear against and slide over a circumferential flange M, secured to the delivery end of the kiln K, and spring devices Y operating upon lever members B tend to force the inner ends of flexible plates N against the bearing flange M. The joint offers no opposition to any movement of the delivery end of the kiln with respect to the furnace structure such as may occur in ordinary operation. Such closing of said clearance space has the effect of causing the combustion air or oxygen to be introduced by way of inlets and pipes in such a manner that it may be introduced under control of the operator, and if desired, the kiln may be operated under pressure of slightly more than atmospheric as indicated by an ordinary pressure gage connected through the wall of the furnace. However, my process can also be carried out with conditions such that the pressure in the kiln is slightly less than atmospheric.

I also provide in the arrangement shown in Figure 13, an air box C built around the furnace structure and suitably protected by fire-brick lining, which air box C is in communication through pipe G with a blower B (generally of larger capacity than the blower W) and the air box C has a multiplicity of outlets J into the furnace F so that air from blower B may be introduced in this manner in addition to the air introduced by blower W and through pipe P. In case oil is introduced as fuel through the pipe B with the addition of steam instead of air, all of the combustion air may be introduced by way of blower B and air box C. The air from outlets J in passing to the combustion chamber impinges on the closure plates N, tending to cool the same and heat the air entering the upper portion of the cylinder and the air entering through the lower portion of air box C rises through the falling treated material tending to cool the same and heat the air, and in general all the air admitted passes toward the center of the flame in the combustion chamber. However, the use of air box C is not necessary and if desired the blower B may be connected directly by pipe I, shown in dotted lines, to a space between pipes P and I and surrounding the burner U. In such case the blower W and pipe P may be omitted and fuel feed E may be connected to pipe I, the end of which then becomes the burner U. As an alternative air from pipe G may be made to enter furnace F or box X through any convenient opening other than those above described, the pressure in the furnace and cylinder may be controlled by suitable adjustment of the operation of the blowers W and B and by adjusting the stack damper D or area of the outlet O.

In any case when the kiln is operated according to my process in one form under pressure and the blower B is used to force in the air all the other openings in the furnace end of the kiln should be substantially closed. I advise not merely the use of the door R for closing the chute X, but also hinging the door R at Q and attaching thereto an arm T, carrying adjustable counter-weight V in order that the finished material may be gradually ejected while a substantial quantity of material still remains piled up at the outlet to constitute a seal to prevent gas or air passing out therethrough which would otherwise be caused by the internal pressure. Since the material treated is generally more or less finely divided, such a pile of it will constitute a sufficient seal at the lower part of the furnace. Also in such case all openings such as at A in the furnace should be closed as by suitable air-tight doors. When it is desired to operate by induced draft, caused by the draft up the stack or by an exhaust fan blower at the stack end of the kiln it is still desirable to provide the sealing means around the clearance space at the delivery end of the kiln, and the lower air seal at the material exit, but one or more of the furnace end openings A may be left open to permit some combustion air to be introduced therethrough, suitable dampers being provided to regulate the admission of air through the openings A. In such case it is preferable to use openings located well below the burner U. If desired the stack damper D may be adjusted to a substantially permanent position and substantial control obtained and maintained by variations in the admission of fuel and combustion air or oxygen. In some cases regulation of the operation of the stack damper is all that is required to maintain suitable conditions. As above pointed out it is not necessary in my process that the furnace end of the kiln be absolutely air-tight or shut off from the atmosphere at all points, but any spaces should be so small that no excess of air will be introduced therethrough and the furnace gas or gases of combustion will not be forced out therethrough.

It will be understood that the various modifications described and shown in the separate figures may be used with any of the forms of apparatus shown in other figures. It has long been known that as such kilns have been operated in the past a much larger amount of fuel has been used than is theoretically required to do the work, the average thermal efficiency being rated at 50 or 60% or less. That is, where one hundred pounds of ordinary cement coal are used and the theoretical amount required is 60 pounds for carrying out the chemical reaction, heating the mix, and supplying necessary losses by radiation, and heat going out with clinker and with stack gases, then the thermal efficiency is said to be 60%. This has been attributed to various causes. The common method of determining whether excess air was being used has been to analyze the stack gases and if substantially no free oxygen was shown it was assumed that continuing low thermal efficiency was due not to excessive air but to one or more of the other possible causes. I have discovered, however, that this was not necessarily so and that the test showed only the presence or absence of more air (oxygen) than was required to combine with the amount of fuel being burned at the time, and did not show whether or not more air was being introduced than was necessary to combine with an amount of fuel which would otherwise be necessary to do the work. In other words even if no oxygen were shown in the stack gases, yet a considerable percentage of the fuel actually being employed might have been made necessary (in order to maintain a temperature suitable to treat the material) by the introduction into the kiln of an unnecessarily large amount of air. According to my process in its preferred form I use conditions of operation such that there may be introduced into the furnace, under the control of the operator, substantially the exact amount of air to combine with the minimum amount of fuel necessary to maintain the temperature of the kiln at a value sufficient to bring about effective treatment of the material, that is I introduce much less fuel than heretofore employed and introduce only little more fuel than that shown by calculation to be the minimum necessary to maintain the proper temperature of the kiln, and then regulate the introduction of the air or oxygen to correspond therewith. The fuel supply is, of course, varied to correspond substantially with varying conditions, such as changes in temperature of the external atmosphere and also to correspond with the varying conditions in composition of the material to be treated and its kind and quantity or rate of feed, moisture content, etc., with the result that the quantities of fuel and air introduced correspond very closely with the actual theoretical requirements, thereby resulting in a marked saving of fuel.

While I have described my improvements in great detail and illustrated various forms of apparatus, which may be used to carry out the process or method, I do not desire to be limited to such details and many other changes and modifications may be made and the invention embodied in widely differing forms without departing from the spirit and scope thereof in its broader aspects. My process in its broader aspects may be used in burning lime, calcining or nodulizing iron ore and other ores and the heat treatment of other materials.

What I claim as new and desire to secure by Letters Patent, is:—

1. The improvement in calcining cement mix to form cement clinker by passing the mix into and through a rotary kiln of the horizontal type from the stack end thereof and out of the kiln at the opposite and furnace end thereof while passing a counter current of hot combustion gases through the kiln from the furnace end thereof, which improvement consists in supplying the fuel to the kiln in proportions substantially fixed with respect to the particular mix being calcined and equivalent to materially less than 2800 B. t. u. (when burned with air) per pound of cement clinker produced from dry mix, while substantially preventing the egress of gases from the furnace end of the kiln and restricting the total area of air openings at the furnace end of the kiln relative to the draft outlets at the stack end until the oxygen supplied is substantially limited to the actual theoretical requirement of the amount of fuel used.

2. The improvement in calcining cement mix to form cement clinker by passing the mix into and through a rotary kiln of the horizontal type from the stack end thereof and out of the kiln at the opposite and furnace end thereof while passing a counter current of hot combustion gases through the kiln from the furnace end thereof, which improvement consists in calcining said mix in a kiln having a length to diameter ratio of about 20 to 1 or less, and restricting the amount of fuel introduced to an amount equivalent to that amount of cement coal which would produce not more than about 2800 B. t. u. per pound of cement clinker produced from dry mix, and substantially preventing all egress of gases at the furnace end of the kiln and restricting and maintaining the amount of air admitted thereto and adjusting the draft with respect thereto until the oxygen supplied is substantially limited to the theoretical requirements of that amount of fuel.

3. The improvement in calcining cement mix to form cement clinker by passing the mix into and through a rotary kiln of the horizontal type from the stack end thereof and out of the kiln at the opposite and furnace end thereof while passing a counter current of hot combustion gases through the kiln from the furnace end thereof, which improvement consists in supplying a regulated quantity of fuel to the furnace end and restricting the quantity of fuel supplied to an amount such that substantially more than 60% thermal efficiency is obtained in the calcination while substantially preventing all egress of gases at the furnace end of the kiln and limiting the quantity of oxygen supplied substantially to the chemical requirements of said limited amount of fuel supplied.

4. The improvement in calcining cement mix to form cement clinker by passing the mix into and through a rotary kiln of the horizontal type from the stack end thereof and out of the kiln at the opposite and furnace end thereof while passing a counter current of hot combustion gases through the kiln from the furnace end thereof, which improvement consists in supplying fuel to the kiln in proportion substantially fixed with respect to the particular mix being calcined and equivalent to substantially less than 2800 B. t. u. (when burned with air) per pound of cement clinker produced from dry mix, while substantially preventing the egress of gases from the furnace end of the kiln and adjusting the draft relative thereto and restricting the air introduced until the air is substantially completely burned to $CO_2$, the oxygen, fuel and cement mix being supplied substantially constantly whereby material variation in the positions of the clinker and preheating zones is prevented and the complete integrity of the clinker lining in the kiln is maintained without substantial variation.

Signed at New York, in the county of New York and State of New York, this 8th day of July A. D. 1919.

JOHN W. HORNSEY.